INVENTORS
KENNETH M. GAVER
LEVI M. THOMAS
ESTHER P. LASURE
ATTORNEY

Patented Dec. 9, 1952

2,621,133

UNITED STATES PATENT OFFICE 2,621,133

PROCESS OF PREPARING LECITHIN DERIVATIVES AND COMPOSITIONS COMPRISING SAME

Kenneth M. Gaver, Esther P. Lasure, and Levi M. Thomas, Columbus, Ohio, assignors to The Keever Starch Company, Columbus, Ohio, a corporation of Ohio Application December 29, 1948, Serial No. 68,022

6 Claims. (Cl. 106—210)

1

The invention disclosed in this application relates to methods for increasing the emulsifiability of unsaturated fats, oils, fatty acids, etc. and to the products of such methods. It is illustrated especially as applied to the improvement of lubricants or assistants for sizing agents for weaving operations. It is especially useful in connection with such sizing agents as starch and starch derivatives. Such lubricants are sometimes termed "softeners" (i. e. plasticizers and lubricants for sizing operations).

In weaving textiles, it is a normal practice to use a sizing agent such as a starch or a starch derivative to coat and impregnate the threads of the textile so as to strengthen them during the weaving operation. It is also fairly common to add to the starch, an assistant, lubricant or "softener" to aid the sliding of the threads over each other and through the loom in the weaving process and to prevent them from sticking to the drying rolls after sizing. Many types of assistants, softeners or lubricants have heretofore been used. Some of these are to a certain extent and in some respects helpful. However, some may even be considered harmful. We have found that certain of the softeners heretofore used may be modified so as to improve their action and that certain other softeners may be synthesized which are better than any of the softeners heretofore used.

One of the objects of this invention, therefore, is the provision of a method of increasing the emulsifiability of unsaturated fats, oils, fatty acids, fatty alcohols, fatty acid esters, fatty amides and fatty amine salts.

A further object is the production of new products consisting of unsaturated fats, oils, etc., with greatly increased emulsifiability.

A further object is the production of improved softeners for use with sizing agents such as starch and starch derivatives in sizing operations.

A further object of the invention is the provision of a method of forming improved softeners.

Other objects and features of the invention will be apparent from the reading of the subjoined specification and claims in connection with the accompanying drawings which illustrate the theory which we believe to be the basis for the disclosed invention.

In the drawings:

Fig. 4 is a diagrammatic illustration of the

Figure 1:
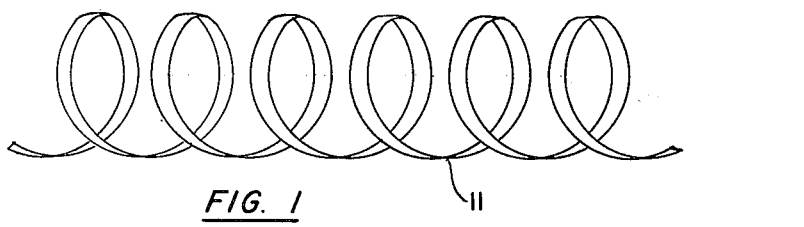
Fig. 1 is an illustration of the assumed shape of one of the types of starch units.

2 assumed combination of the softener with the starch unit.

We have found that when unsaturated fatty acids, unsaturated fats, unsaturated oils, etc., are subjected to glycolic oxidation whereby two adjacent hydroxyl groups are added to the compound adjacent to the point of the previously existing double bond, the resulting product is much more easily emulsifiable than the non-hydroxylated compound.

Specifically we have discovered that by the process of subjecting phospholipids, which have one or more esters of unsaturated acids as substituents, to glycolic oxidation, we can obtain much improved lubricants. We have developed as a basis for our discovery the proposition or principle that improved lubricants may be selected from a group which have similar molecular configurations, if those selected compounds have such a configuration that (1) one end of the molecular chain can enter into the starch spiral while (2) a protuberance or block on the chain prevents the molecule from going entirely into the spiral and (3) the other end of the chain has excellent lubricating qualities but yet is hydrophilic. Thus, an excellent assistant or lubricant for the starch may be obtained, which is water dispersible and thus may be more easily removed after the weaving operation.

Based on the above stated principle we have developed new and useful sizing lubricants which we have found by test are much better than previously used lubricants. These lubricants do not harmfully affect either native starches, thin boiling starches, or starch derivatives. It is to be understood, however, that in using such starch assistants, in order to obtain optimum results, a starch or starch derivative should preferably be used which is itself soluble and is not subject to retrogradation. Nevertheless, our improved lubricants are useful in connection with all starch sizing compounds .

As just stated, the types of starch or starch derivatives which are most suitable for use in connection with our invention are those which are themselves not subject to retrogradation. For instance, we advise the use of starch subacetates, starch carbamates and alkali metal starchates or their derivatives in which some element or group has been substituted for the hydrogen of the hydroxyl on the number two carbon of the starch unit as is disclosed in a co-pending application Serial No. 707,318, filed by applicant Kenneth M. Gaver, November 1, 1946, and as is disclosed though not claimed in an issued Patent 2,397,732. Starch derivatives may be produced by the reaction of an amidogen compound (such as, for example, urea) and starch in a non-aqueous solvent at a temperature of from 80° C. to 115° C. Native starch, itself (not soluble in cold water, but dispersible in warm water), is subject to retrogradation and after having retrograded will not dissolve even in heated water. Other dispersible starches such as the so-called soluble starches of a fluidity of 90 will retrograde even faster than native starch and are thereafter not normally dispersible after weaving. The assistants referred to in this application will not prevent this retrogradation of dispersible starches, but will aid such sizes, and, unlike some of the assistants previously used, our assistants will not harmfully affect the non-retrograding starches.

Some of the assistants mentioned herein broadly have been used heretofore with sizing compounds. For example, unmodified lecithin which is one of the lubricants mentioned has been used heretofore in sizing operations. However, I have found that these assistants must be modified in order to accomplish their intended purpose most efficiently.

As stated above, the substances which may be best used as assistants to such modified or derivative starches are broadly long chain units having a block intermediate the ends thereof. That is, the assumed chemical structure of such compounds is that of a long chain carbon compound, having intermediate its ends, a block or transversely extending radical or radicals, having sufficient length at one end of the chain to enter into the spiral of the starch, and having at the other end one or more fatty chains which serve as lubricants, the fatty chains having one or more hydrophilic groups so as to facilitate the water dispersion of the assistant. The assistants which we have discovered conform to such a pattern and preferably are modified phospholipids. Therein, at least one of the fatty chains should be unsaturated and such chain may be oleic. Ricinoleic, linoleic and linolenic are also satisfactory. Often the lower cost of oleic compounds would cause their selection. We also prefer that a group such as choline be present.

Thus, one group of preferred agents are the lecithins which have been changed in accordance with the processes disclosed herein. Other improved substances are similar modifications of other of the oils and fats and fatty acid esters such as, for example, soy bean oil, castor oil, cotton seed oil, peanut oil, wool grease, lanolin, etc. Fatty alcohols such as oleyl alcohol are also improved. Unsaturated fatty acids, unsaturated fatty amides and unsaturated fatty amine salts may be similarly processed with advantage. Lecithins are of several types. We prefer that at least some of the units in the lecithin be of the type conforming substantially to the formula

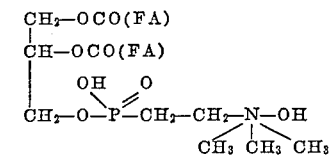

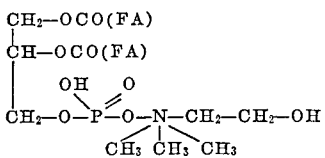

where the symbols (FA) indicate fatty acids and at least one of these fatty acids is unsaturated. Instead of the methyl groups attached to the nitrogen, if desired, there may be other alkyl radicals. According to the principle developed by us, one end of the unit shown above (i. e. the radical OH or the radical $C_2H_4OH$) enters into the spiral of the starch unit.

While normal starch is slightly acidic we find that the combination of these lubricants or assistants with starch function better as the pH is brought closer to neutrality. Therefore, it is preferable that the lubricant remain slightly alkaline as crude hydroxylated lecithin naturally is. The alkalinity should not be sufficient to bring the pH of the mixture of the modified lecithin with the starch to the alkaline side of neutrality.

In each case, the fatty chain is modified so that the hydrophilic character of one (an outer) end of the unit is increased and thus the compound becomes more easily water dispersible. This modification of the assistant may be accomplished by any type of glycolic oxidation such as by means of peroxide type oxidants as, for example, sodium perborate, barium chlorate, alkaline permanganate, sodium carbonate peroxide, sodium phosphate peroxide, hydrogen peroxide, etc., which serve to hydroxylate the fatty esters at the points of unsaturation.

Figure 2:
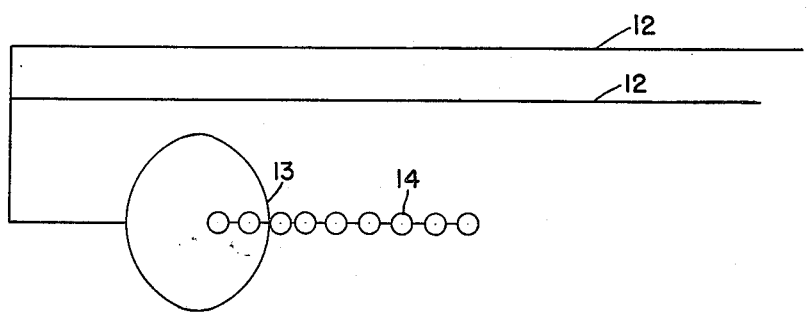
Fig. 2 is an illustration of the assumed shape of one of the units of an improved softener to be used with a starch or starch derivative.

Referring again to the drawings, it may be seen that we have shown at 11 in Fig. 1, the assumed spiral structure of the long chains of starch, it being understood that each of the chains is made up of a plurality of glucopyranose units and that preferably, though not necessarily, each of these units in the native starch have been modified by the substitution of some other element or group for the hydrogen of the hydroxyl group which was positioned on the number two carbon atom of each unit. Such modification will prevent the retrogradation of the starch and maintain the starch throughout the sizing operation and thereafter as a soluble or dispersible starch. In Fig. 2 there is shown the assumed structure of the assistants or softeners which are compounded in accordance with our invention. It will be noticed that in Fig. 2, the softener is assumed to have one or more long fatty chains 12 and has a block 13 intermediate its ends. The other end 14 has a portion which is adapted to enter into the spiral of the starch of the starch chain shown in Fig. 1. It will be noticed in Fig. 4 that as shown this inner end 14 of the assistant is long enough (it may be shorter if it possesses sufficient attraction for the starch) so that it may be firmly anchored within the starch spiral. The outer ends 12 may be of any convenient length. However, preferably the end 14 should not be too long inasmuch as it is desirable that the block 13 should abut adjacent to the end of the spiral 11. It will be noticed also that the block 13 is so wide that it cannot enter into the starch spiral. Furthermore, although the outer ends 12 may be of any convenient length, yet they preferably should be of a fatty character so that it will form a lubricant and should be provided with a hydrophilic group whereby the assistant itself becomes dispersible or soluble in water. It is not necessary that the inner end 14 have a fatty character but it is necessary that a hydrogen bonding position or positions be provided thereon. In fact, it is preferable that this inner end 14 of the assistant should not have fatty characteristics and should not have branching groups secured thereto which might serve as blocks.

Figure 3:
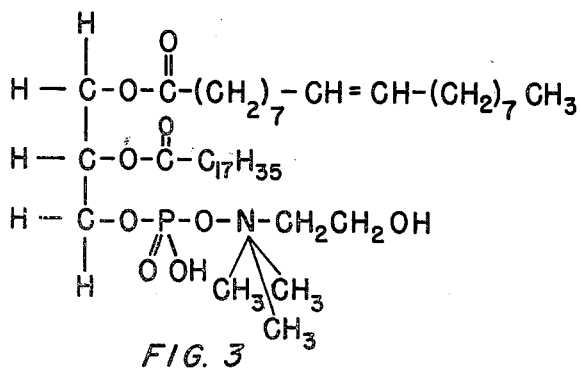
Fig. 3 is a structural formula of one of the lecithins.

Referring to Fig. 3, it will be realized that the radical NC₂H₄OH (which might also be NOH etc.) corresponds to the end 14; the radicals (CH₃)₃ correspond to the block 13 and that most of the rest of the compound corresponds to the ends 12.

It must be understood, moreover, that the utilization of the basic principle discovered by us in the application of the principle to assistants or lubricants for sizing compounds is only one application of that basic principle. Also it must be realized that we have found that the application of this principle to starch sizing gives results surpassing anything previously utilized in sizing operations.

Figure 4:
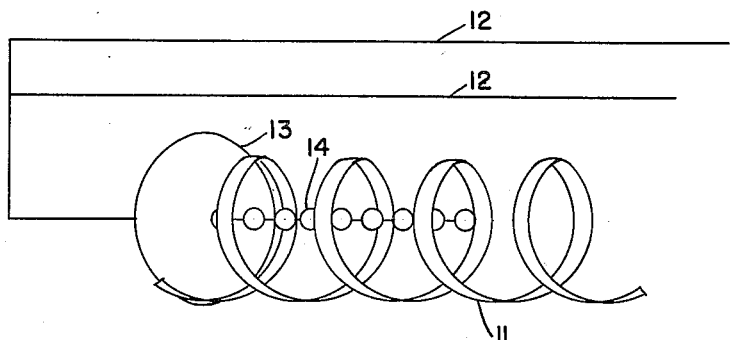

While, as suggested above, we desire that the end 14 be of sufficient length that it may extend a substantial distance into the starch spiral 11, yet it need not necessarily be as long as indicated in Figs. 2, 3, and 4 inasmuch as apparently even lecithins of the type

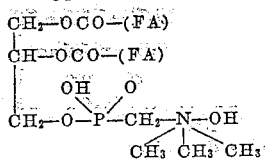

(in which the symbol (FA) represents fatty acids and at least one of these fatty acids is unsaturated) also are suitable, as are also lecithins in which the hydroxylated alkyl radical attached to the nitrogen atom is the radical CH₂OH or is a longer radical such as —C₃H₆OH. Where the radical is only the hydroxyl OH as shown above, the end 14 comprises only the radical OH but even though short this group provides a strong hydrogen bonding position. Thus, the lecithin units are dispersed sufficiently throughout the starch mixture so as to provide the desired lubricating characteristics. The hydroxyl group attached to the nitrogen provides the hydrogen bonding group for the starch unit. The fatty acid esters provide the lubricating qualities and the substituted hydroxyls in at least one of the fatty acid ester groups improves greatly or even insures the water dispersibility of the lecithin assistant.

In the performance of the glycolic oxidation of fats we prefer to mix the fat with water and then add the oxidant slowly in such a manner that it is thoroughly mixed through the water and fat. Other methods may be used such as mixing the fat and oxidant and adding water, or even in some cases mixing the water and oxidant and adding the fat thereto. Any other method of glycolic oxidation may, if desired, be used with suitable fats, oils, and fatty acids, fatty alcohols, fatty amides and fatty amine salts.

Prior hereto glycolic oxidation of unsaturated materials has been employed for the purpose of detecting the presence or absence of double bonds. However, so far as we know, such procedure has never been employed even with substantially homogeneous fatty acids, fatty alcohols, or fatty acid esters for the purpose of improving the characteristics (e. g. water dispersibility) of such compounds. Nor so far as we know have such procedures ever been applied at all to heterogeneous fats, oils, fatty acids, etc., whether for the purpose of improving the characteristics of such compounds, for analysis, for testing or for any other purpose.

As examples of the practice of our invention we submit the following:

Example I

We mixed 100 g. soya bean lecithin with 100 ml. water and then added slowly 10 g. sodium perborate. We stirred thoroughly and allowed the mixture to stand overnight to permit the double bonds of oleic acid to be partially oxidized to the corresponding glycol derivative. The sodium perborate was reduced to sodium borate and left in the mixture.

While the untreated lecithin either when used alone or when used in combination with starch was absolutely insoluble and could not be dispersed in hot or cold water, the oxidized lecithin is easily dispersible in water, hot or cold, or in starch mixtures.

Example II

We mixed 28 g. oleic acid with 100 g. water and then added slowly 70 g. sodium carbonate peroxide. The alkali peroxide was added slowly because the carbon dioxide created by the reaction generated considerable foam. We let the mixture stand overnight. The hydrogen peroxide contained in the sodium carbonate peroxide oxidized the double bonds contained in the oleic acid to the corresponding glycol. While this treatment converts a majority of the double bonds to the glycol, the oxidation was incomplete. Exhaustive oxidation was achieved by periodically adding more sodium carbonate peroxide until all of the double bonds were oxidized. The product was sodium dihydroxystearate. The product analyzed to an average of 1.5 hydroxyl groups per oleic acid molecule. In completing the process, we each time added about 17 g. sodium carbonate peroxide and allowed the mixture to stand overnight repeating until we had added in all about 120 g. of the sodium carbonate peroxide. While the untreated oleic acid was not dispersible in either hot or cold water, the completely oxidized oleic acid was much more dispersible in water and its dispersibility in starch mixtures was very greatly improved.

Example III

We mixed 30 g. ricinoleic acid, 100 g. water and 4 g. sodium hydroxide. We then added a small quantity of additional sodium hydroxide slowly in order to adjust the alkalinity to a pH of 10. We then added 30 g. sodium phosphate peroxide and let the mixture stand overnight.

As the reaction proceeded considerable foam formed during the oxidation. This process converted a majority of the double bonds to the corresponding glycol but the oxidation was incomplete. We completed it by adding periodically about 25% (7 g.) of additional sodium phosphate peroxide and allowing the mix to stand overnight for several repetitions. While the untreated ricinoleic acid was not dispersible in either hot or cold water, the completely oxidized product was much more dispersible and its dispersibility in starch mixtures was very greatly improved.

Example IV

We mixed 75 g. peanut oil, 250 g. water and 20 g. potassium carbonate. We then added 31 g. potassium permanganate. We agitated overnight at room temperature. We destroyed the precipitated manganese oxides with a little sodium sulfite and separated the oil in the usual manner and washed free of soluble impurities.

While the untreated peanut oil could not be dispersed, the oxidized product was much more dispersible and its dispersibility in starch mixtures was very greatly improved.

Example V

We mixed 80 g. castor oil, 225 g. water, and 25 g. sodium bicarbonate. We then added 25 g. 30% hydrogen peroxide. We agitated continuously. After 24 hours we added an additional 25 g. 30% hydrogen peroxide and agitated for 24 hours additional. We separated the oil and washed free of soluble impurities. The dispersibility of the oxidized castor oil was improved and its dispersibility in starch mixtures was very greatly improved.

Example VI 100 g. of sorbitan oleate was admixed with 25 g. of sodium perborate and then 100 ml. of water was added. This mixture was heated on a steam bath for 2 hours with frequent shaking. After standing overnight, the product was extracted with ethanol and dried. Analysis (acetyl value) of the product showed that 60% of the available double bonds had been oxidized glycolically.

When non-oxidized sorbitan oleate was used with starch, it interfered with granule swell and all but prevented granule rupture. When the product of the above process was used in conjunction with starch, it behaved as a stabilizer for the cooled starch.

It is to be understood that the above described embodiments of our invention are for the purpose of illustration only and various changes may be made therein without departing from the spirit and scope of the invention.

We claim:

1. A process for preparing a composition including a stable water-dispersible lecithin derivative comprising the steps of selecting a lecithin having at least one unsaturated fatty acid ester and having a hydroxyl group attached to the nitrogen atom and subjecting the lecithin to glycolic oxidation by mixing the lecithin with an oxidant selected from the group consisting of sodium perborate, barium chlorate, alkaline permanganate, sodium carbonate peroxide, sodium phosphate peroxide, and hydrogen peroxide in water with a sufficient amount of the oxidant and a sufficient alkalinity in the mixture to glycolically oxidize at least 60% of the double bonds originally available in the lecithin.

2. A process for preparing a composition including a stable water-dispersible lecithin derivative comprising the steps of selecting a lecithin having at least one unsaturated fatty acid ester and having a hydroxylated alkyl radical attached to the nitrogen atom and subjecting the lecithin to glycolic oxidation by mixing the lecithin with an oxidant selected from the group consisting of sodium perborate, barium chlorate, alkaline permanganate, sodium carbonate peroxide, sodium phosphate peroxide, and hydrogen peroxide in water with a sufficient amount of the oxidant and a sufficient alkalinity in the mixture to glycolically oxidize at least 60% of the double bonds originally available in the lecithin.

3. A process for preparing a composition including a stable water-dispersible lecithin derivative comprising the steps of selecting a lecithin having at least one unsaturated fatty acid ester and having a hydroxylated alkyl radical attached to the nitrogen atom and mixing the lecithin with an oxidant in water in the presence of an alkaline agent of sufficient alkalinity and with a sufficient amount of the oxidant in the mixture to glycolically oxidize at least 60% of the double bonds originally available in the lecithin.

4. A process of preparing a composition of matter comprising a stable water-dispersible lecithin and a starch dispersion comprising the steps of mixing a lecithin with an oxidant in water in the presence of an alkaline agent of sufficient alkalinity and with a sufficient amount of the oxidant in the mixture to glycolically oxidize at least 60% of the double bonds originally available in the lecithin, mixing said hydroxylated lecithin with a starch dispersion.

5. An assistant for a starch size comprising a hydroxylated lecithin obtained by mixing a lecithin with an oxidant in water in the presence of an alkaline agent of sufficient alkalinity and with a sufficient amount of the oxidant in the mixture to glycolically oxidize at least 60% of the double bonds originally available in the lecithin.

6. A composition of matter comprising a hydroxylated lecithin obtained by mixing a lecithin with an oxidant in water in the presence of an alkaline agent of sufficient alkalinity and with a sufficient amount of the oxidant in the mixture to glycolically oxidize at least 60% of the double bonds originally in the lecithin mixed with a starch dispersion.

KENNETH M. GAVER.
ESTHER P. LASURE.
LEVI M. THOMAS.

REFERENCES CITED

The following references are of record in the file of this patent:

UNITED STATES PATENTS

| Number | Name | Date |
|---|---|---|
| 1,872,913 | Dreyfus | Aug. 23, 1932 |
| 1,892,588 | Schwieger | Dec. 27, 1932 |
| 1,893,393 | Bollmann | Jan. 3, 1933 |
| 2,081,180 | Leupold | May 25, 1937 |
| 2,233,001 | Dickey | Feb. 25, 1941 |
| 2,310,679 | De Groote | Feb. 9, 1943 |
| 2,381,587 | Griffin | Aug. 7, 1945 |
| 2,445,948 | Wittcoff | July 27, 1948 |